United States Patent [19]

Deziel

[11] Patent Number: 5,163,006

[45] Date of Patent: Nov. 10, 1992

[54] SYSTEM FOR DESIGNING CUSTOM-MADE, FORMFITTED CLOTHING, SUCH AS BATHING SUITS, AND METHOD THEREFOR

[75] Inventor: Michelle Deziel, 5440 N. Ocean Dr., Unit 1201, Riviera Beach, Fla. 33404

[73] Assignee: Michelle Deziel, Riviera Beach, Fla.

[21] Appl. No.: 480,551

[22] Filed: Feb. 15, 1990

[51] Int. Cl.[5] ............................................. G06F 15/46
[52] U.S. Cl. .................................. 364/470; 364/188; 364/192; 364/468
[58] Field of Search ............... 364/188, 189, 192, 469, 364/468, 470, 521; 358/93, 101, 104, 107; 33/11, 15, 17 R, 17 A, 512

[56] References Cited

U.S. PATENT DOCUMENTS

| | | | |
|---|---|---|---|
| 4,539,585 | 9/1985 | Spackova et al. | 358/93 |
| 4,546,434 | 10/1985 | Gioello | 364/470 |
| 4,598,376 | 7/1986 | Burton et al. | 364/470 |
| 4,873,643 | 10/1989 | Powell et al. | 364/470 |
| 4,885,844 | 12/1989 | Chun | 223/68 |
| 4,899,448 | 2/1990 | Huang | 33/17 R |
| 4,916,624 | 4/1990 | Collins et al. | 364/470 |
| 4,926,344 | 5/1990 | Collins et al. | 364/470 |
| 4,949,286 | 8/1990 | Ohba | 364/521 |

OTHER PUBLICATIONS

Retailing Technology and Operations, vol. 8, "Goodby Tape Measure".
Las Vegas, N.V. Review-Journal article entitled "Computerized fittings answer to swimsuit dilemmas".
Women's Wear Daily "Suit Systems", May 11, 1988.
Women's Wear Daily "Do-it-yourself Swimwear", Apr. 5, 1988.
Domestic News "Bright and Brief", Jul. 1, 1984.

Primary Examiner—Jerry Smith
Assistant Examiner—Thomas E. Brown
Attorney, Agent, or Firm—Quarles & Brady

[57] ABSTRACT

The system for designing custom made, formfitting clothing, such as bathing suits, includes a video camera that captures front, side and back views of the female or human form and generates front, side and back video frame images thereof. In one embodiment, the operator electronically outlines the front, side and back trunk of the female form using these images. The computer generates front, side and back outline maps of the trunk. The operator then selects a plurality of vertically spaced measuring points along the front and side outline maps. The computer calcultes the lengths of a plurality of circumferential curves about the female at the measuring points based upon the front and side outline maps. The curve lengths are then converted into cutting dimensions for cloth. The operator selects one of a plurality of standard style and size selections of formfitting clothing from a look-up table having standard pattern maps. The computer generates custom pattern maps by altering the standard pattern maps based upon the cloth cutting dimensions. The custom pattern maps, front, side and back outline maps and the cloth cutting dimensions are displayed for the operator. A method of generating custom made, formfitting clothing designs is also disclosed.

34 Claims, 9 Drawing Sheets

SYSTEM FOR DESIGNING CUSTOM-MADE, FORMFITTED CLOTHING, SUCH AS BATHING SUITS, AND METHOD THEREFOR

BACKGROUND OF THE INVENTION

The present invention relates to a system for designing custom made, formfitting clothing such as bathing suits and a method therefor.

One prior art system utilized a video camera and a recorder (VCR) to record front and side video images of the female person to be fitted with a bathing suit. The operator of the system would select an appropriate video frame by operating the pause or stop button on the VCR. After selecting the video frame, the system would then permit the operator to target a plurality of vertically spaced, left and right point pairs on the displayed video image. Each left and right point was individually identified by the operator. After selection of the plurality of vertically spaced pairs, the computer would measure the distance between these left and right points like an electronic tape measure. For example, the distance between the left and right points on the front view video image might represent the width of the female at, for example, the waistline. The distance between left and right points on the side view video image coplanar with the female bust determines the "depth" of the female at that vertical measuring point. The computer would then utilize an elliptical curve formula and determine the circumference of the female form at the various vertically spaced point pairs. The computer then calculated cloth cutting dimensions for those targeted points and took into account a fixed stretch factor for the fabric. The cloth cutting dimensions were then printed. The operator had the capability of electronically adding designer's notes to this data. The designer's notes were printed along with the cloth cutting dimensions. Importantly, the cloth cutting measurements only referred to the particular left and right pairs of points selected by the operator. In order to produce the custom made bathing suit, a seamstress would read the designer's notes and cloth cutting dimensions, select a standardized style and size pattern and make the customized suit by using the cutting dimensions and estimating a customized suit pattern from the standard pattern. The seamstress would estimate the curves for the customized pattern from the cutting dimensions on the print out.

Another prior art system utilizes a video camera and a computer that freezes a color video image on the computer screen. The customer or person purchasing the custom made bathing suit then works with the operator/designer and a multi-directional cursor or stylus to electronically draw design features on the video image. For example, the multi-directional cursor could be utilized to draw in a ruffle on the frozen image. The video image with its overlaid design option is stored in the computer and finally printed out with electronically input designer's notes.

OBJECTS OF THE INVENTION

It is an object of the present invention to provide a computerized system for designing custom made, formfitted clothing, such as bathing suits, utilizing a video camera and electronic processing techniques.

It is another object of the present invention to provide a system in which an operator selects one of a plurality of standard style and size patterns for formfitted clothing, such as bathing suits, and that selected style and size corresponds to a standard pattern map. The system generates a custom pattern map by altering the standard pattern map based upon clothing dimensions derived from electronically calculated, circumferential measurements that are further processed to account for fabric stretch.

It is another object of the present invention to provide the operator with design features that can be overlaid on front, side and back outline maps of the human form.

It is another object of the present invention to provide a system wherein the operator can alter the custom pattern map independent of the electronic calculations conducted by the computer.

SUMMARY OF THE INVENTION

The system for designing custom made, formfitting clothing, such as bathing suits, includes a video camera that captures front, side and back views of the female or human form and generates front, side and back video frame images thereof. In one embodiment, the operator electronically outlines the front, side and back trunk of the female while viewing the front, side and back video frame images. The computer generates front, side and back outline maps of the trunk. The operator then selects a plurality of vertically spaced measuring points along the front and side outline maps. The computer calculates the lengths of a plurality of circumferential curves about the female at the measuring points based upon the front and side outline maps. The curve lengths are then converted into cutting dimensions for cloth. These cloth cutting dimensions take into account fabric stretch and other factors. The operator selects one of a plurality of standard style and size selections of formfitting clothing from a look-up table. The look-up table correlates the selections to standard pattern maps. The computer generates custom pattern maps by altering the standard pattern maps based upon the cloth cutting dimensions. The custom pattern maps, front, side and back outline maps and the cloth cutting dimensions are displayed for the operator. The system also produces a representative output of the custom pattern maps, the outline maps and the cloth cutting dimensions. A method of generating custom made, formfitting clothing designs is also disclosed.

BRIEF DESCRIPTION OF DRAWINGS

Further objects and advantages of the present invention can be found in the detailed description of the preferred embodiment when taken in conjunction with the accompanying drawings in which.

DETAILED DESCRIPTION OF THE PREFERRED EMBODIMENT

The present invention relates to a system for designing custom made, formfitted clothing, such as bathing suits, and a method therefor. Although the system and method described hereinafter relate to designing a custom-made bathing suit for a female, the invention could be applied to design custom-made, form-fitted clothing generally for both males and females.

Figure 1:
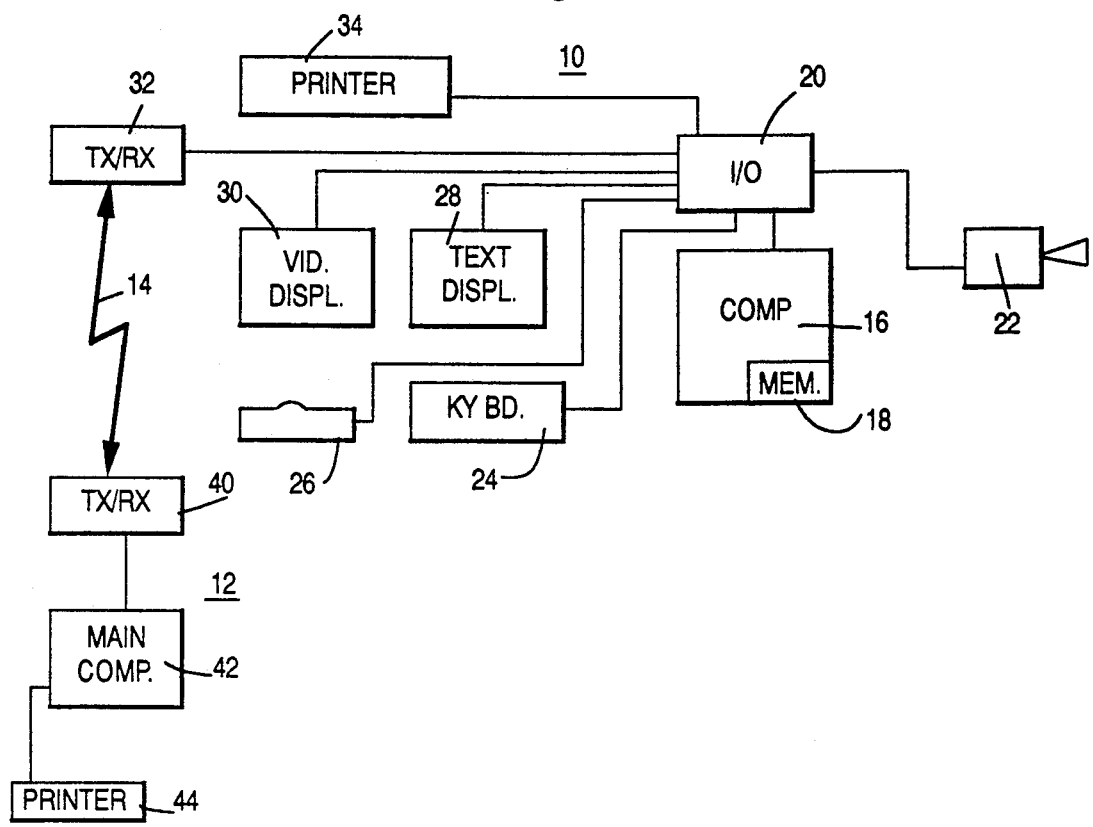
FIG. 1 schematically illustrates the system for designing custom made, formfitted clothing and includes both a local computer system and a remote computer system.

FIG. 1 schematically illustrates the system which includes a local computer system 10 and a remote computer system 12. Local computer system 10 is coupled to remote computer system 1 via telecommunication line 14 schematically illustrated in FIG. 1. Local computer system 10 includes a computer or processor 16 having a memory (mem) 18. In a preferred embodiment, computer 16 is an IBM AT 286 machine or other similar IBM compatible computer with a 40 MB hard disc drive and a 1.2 MB floppy disc drive. Computer 16 also includes an input/output device 20 that couples computer 16 to a video camera 22, a keyboard 24, a multi-directional cursor control 26, a text display monitor 28, a video display monitor 30, a transmission/reception communications device 32 and a printer 34. Input/output device 20 preferably is included within the housing of the computer. In one embodiment, video camera 22 is a JVC CCD video camera. Multi-directional cursor control 26 is a mouse that is run over a spatially marked tablet. This mouse and tablet is a Summa SKETCH PLUS input device. The mouse could be replaced by a joy stick cursor control. Also, the cursor control could be embodied as a stylus that cooperates with a special monitor such that when the stylus touches the monitor, the operator has electronically targeted and marked that point. Alternatively, the monitor itself could be "touch sensitive" such that the operator could target points by simply touching the screen of the monitor. In the current embodiment, video display monitor 30 is a color monitor. Monitor 34 is a text display monitor. A single monitor could replace both monitors as discussed later. Printer 34 is a wide carriage, dot matrix printer capable of printing at 270 cps. In the preferred embodiment, transmission/reception device 32 is a modem that is connected to either a dedicated or a standard telephone line for handling communications over telecommunications line 14.

Remote computer system 12 includes transmission/reception device 40 and a main computer 42. Main computer 42 includes many additional features not illustrated herein, such as a keyboard and monitor such that the electronic representations of the custom pattern maps, cloth cutting dimensions, outline maps, and other data from the local computer can be viewed and printed by the main computer system. Transmission/reception device 40 is preferably a modem. Main computer 42 is connected to a printer 44 that produces the print out of the custom pattern maps and cloth cutting dimensions.

This type of local computer system and remote computer system would permit operators at a plurality of geographically diverse locations to obtain data regarding customized bathing suit production and have the suits made or manufactured at a centralized location. Main computer 42 and its peripherals would be located at the centralized location along with various seamstresses and fabric supplies. This centralized manufacturing system would reduce costs. It should be noted that transmission/reception devices 32 and 42 could be facsimile machines or facsimile boards used in conjunction with computers 16 and 42, respectively.

FIG. 2 illustrates, in block diagram form, the main program for this system. In general, the system for designing custom made, formfitting clothing is an interactive operator or user system that requires human input at various stages. The program that is discussed herein is currently considered to be the best mode of the system. However, changes and modifications to the system will be apparent to a person of ordinary skill in the art, and those changes and modifications are meant to be encompassed by the appended claims which set forth various features of the invention. For example, the processing steps illustrated herein may be rearranged to promote a more efficient use of the processing capabilities of the computer equipment. The program illustrated in block diagram form in FIG. 2 begins with a sign-on step 110. The sign-on step essentially is a sign on routine such that the operator working with the local computer 10 of the system can log in his or her name, password and other information relevant to accounting and record keeping for the system. The sign on information is placed on the text display monitor 28. The operator inputs the information required by the system during keyboard input step 112. The system then changes the control from keyboard 24 and text display monitor 28 to video display monitor 30 and the multi-directional cursor control 26 or mouse 26 in step 114. A person of ordinary skill in the art will recognize that the system may be altered to use a single monitor that is capable of displaying both text and video or color images. This feature is meant to be encompassed by the appended claims.

In decision step 116, the system determines whether this is the first daily use of the system. If so, the yes branch (Y branch) is taken and the main program calls up calibration routine 118.

Figure 4:
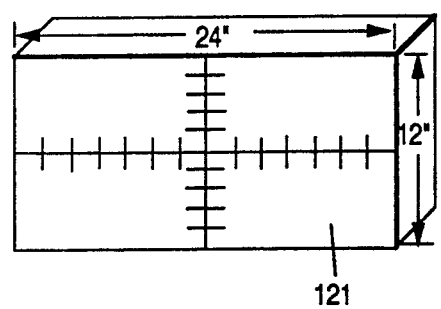
FIG. 4 schematically illustrates a calibration target box utilized to normalize the distances detected by the system during the process of producing custom made patterns.
Figure 2A:
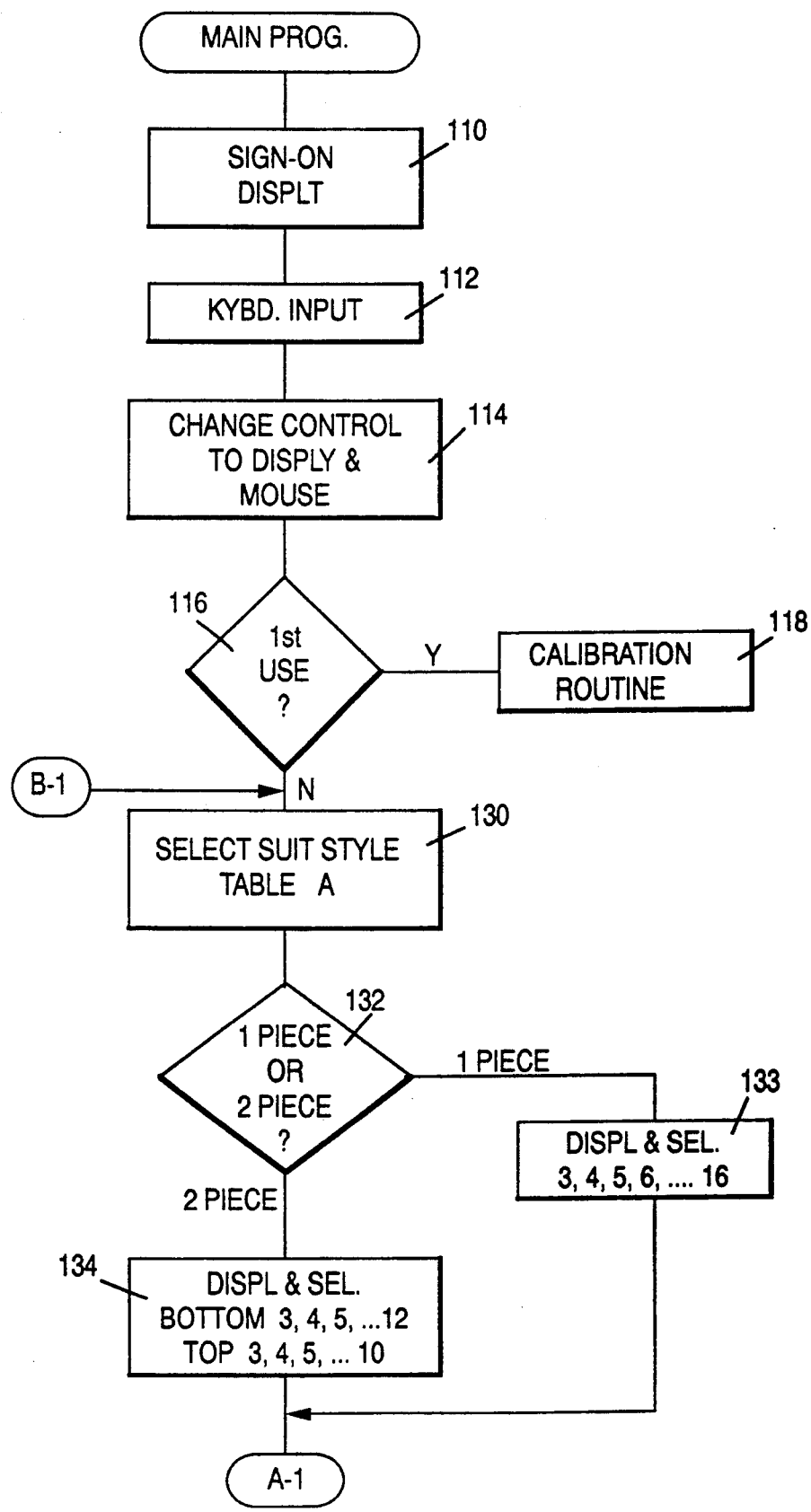
FIGS. 2A-2D illustrate, in block diagram form, the main program for the system.
Figure 2B:
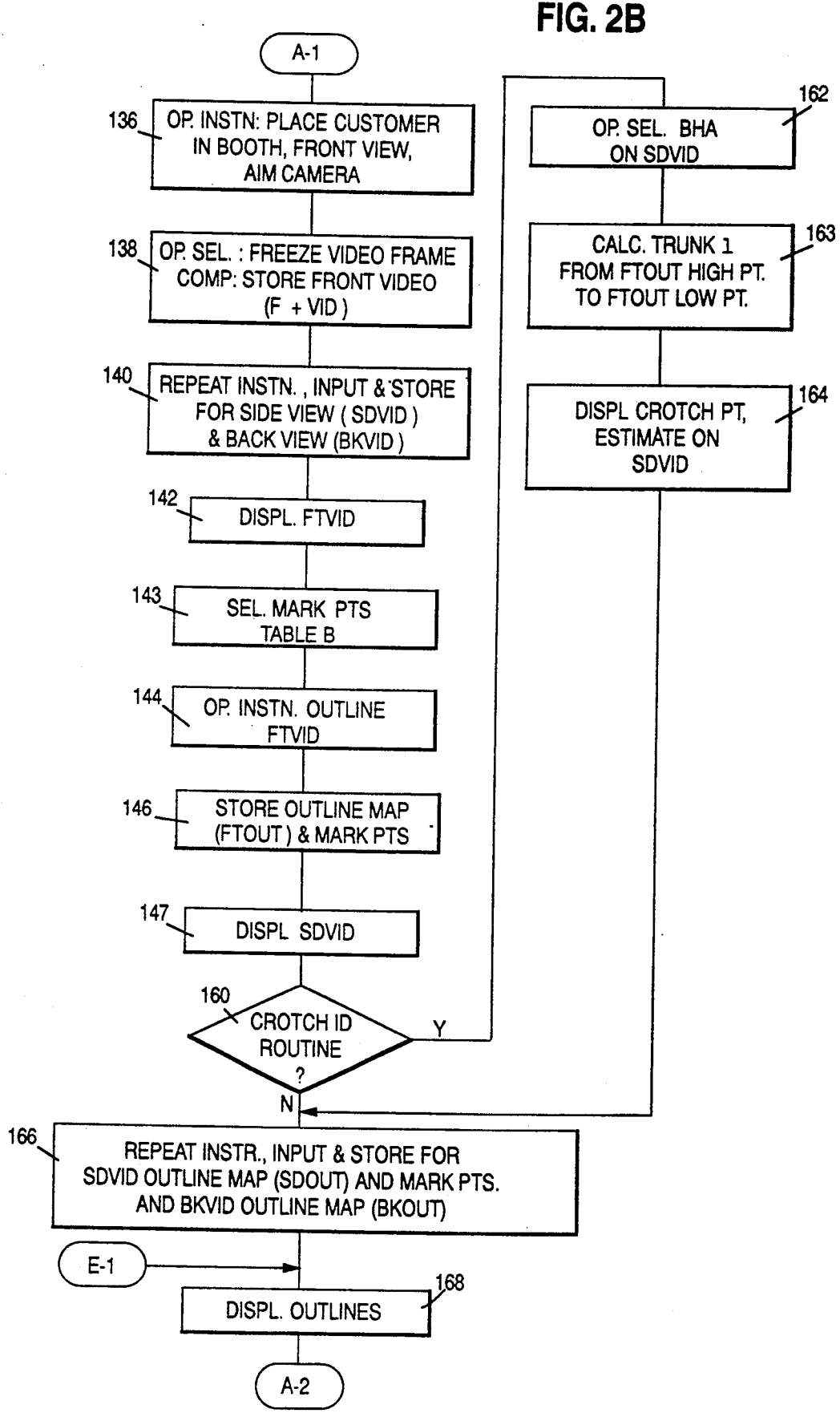
Figure 2C:
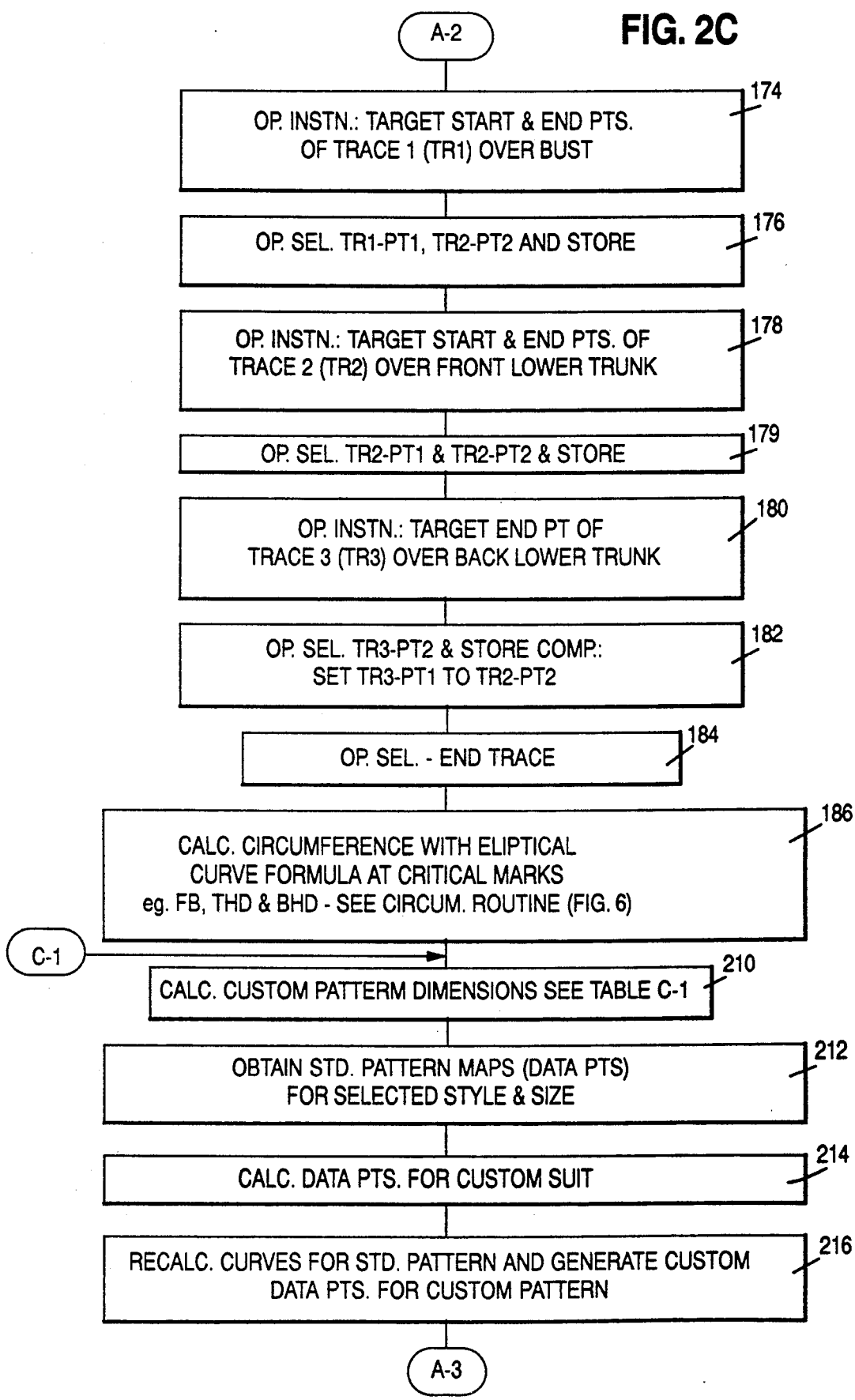
Figure 2D:
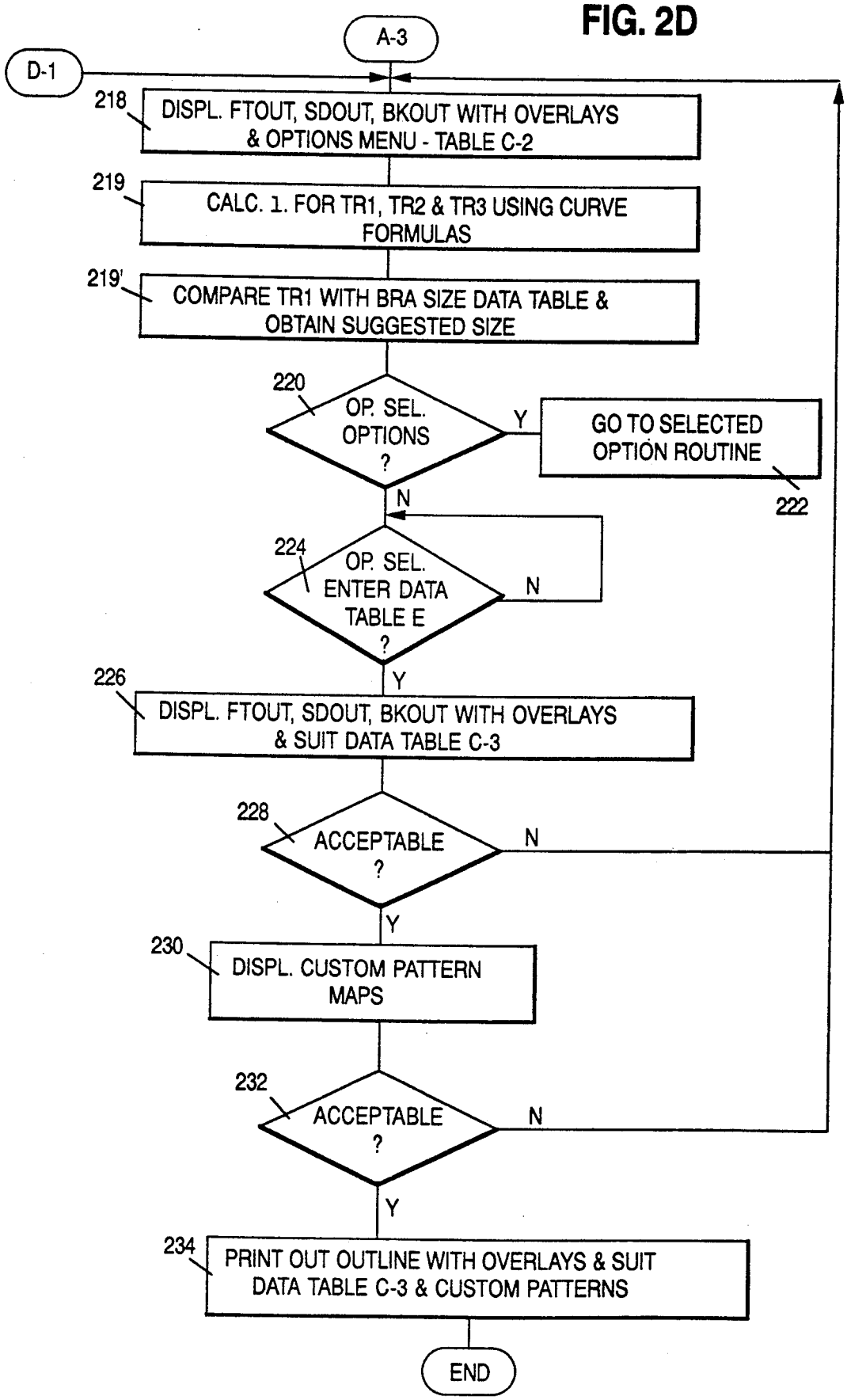
Figure 3:
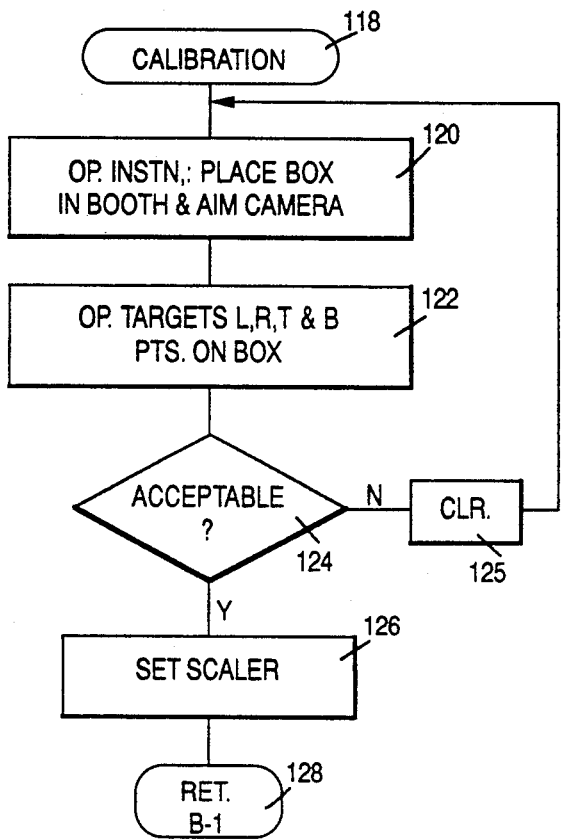
FIG. 3 illustrates, in block diagram form, the calibration subroutine.

FIG. 3 shows calibration routine 118 in block diagram form. The first step in the calibration routine, step 120, instructs the operator to place a spatially marked target box into a customer viewing booth and aim the video camera 22 (FIG. 1) at the target box. Target box 121 is schematically illustrated in FIG. 4. In the present embodiment of the invention, the front face of box 121 is spatially and uniformly marked both horizontally and vertically at, for example, 1" intervals. Presently, the box is 24" wide and 12" high with 1" spaced indicia located on the perpendicular lines on the face of the box. Target box 121 is placed in a booth within the viewing range of video camera 22 (FIG. 1). The present embodiment of the system designs formfitting swimwear for females. Females typically select a bathing suit from a representative number of styles and sizes, put the representative suit on and stand in the viewing booth at which time their body form is viewed and captured by video camera 22. In order to convert the video image measurements into actual measurements, the system must be normalized or scaled on a daily basis using target box 121 placed in the booth at approximately the same location as the females. The computer stores both horizontal and vertical normalization factors (scalers) and uses these factors during the subsequent processing steps.

Returning to the calibration routine illustrated in FIG. 3, the operator targets left, right, top and bottom points on the box in step 122. This targeting is done by viewing the target face of box 121 on video display monitor 30, moving multi-directional cursor control 26 to the left, right, top and bottom (L, R, T, and B) points on the face of the box and actuating the cursor control on mouse 26 at those points. It should be noted that mouse 26 could be replaced by a joy stick or, in a less sophisticated embodiment, by a standard vertical and horizontal cursor control (the up and down and side to side arrows on a typical personal computer). In decision step 124, the operator or the system, as necessary, determines whether the targeting is acceptable. The computer itself could sense the L, R, T and B points if the face of the box were colored white, and the edges of and indicia on the target face were marked in black. The program could sense the edges using an edge detection routine on the video image. The edge detection routine could be used exclusively to calculate the normalization factors or be used in conjunction with operator input such that the computer checks the operator input or the operator checks the computerized target selection of L, R, T and B points. If the calibration was not successful, the no branch (N branch) is taken and step 125 clears the targeted points and returns the routine to step 120. If the calibration was successful, the yes branch is taken and step 126 sets the scaler or normalizing factors in the program. After the scaler is set in both the vertical and horizontal sense, step 128 returns the program to the main program. As illustrated herein, the programs are linked by jump points. Therefore, the calibration routine 118 ends at jump point B-1 which returns the system to the main program at jump point B-1 following decision step 116.

In the main program (FIG. 2), if the system has been calibrated, the decision step 116 takes the no branch and in step 130, the operator selects a suit style. The following table, Table A, Suit Selections, shows various types of 1 piece and 2 piece design sample suits. For 2 piece suits, the operator selects both top and bottom styles.

TABLE A

| | SUIT SELECTION | |
|---|---|---|
| 1 Piece | 2 Piece Bottom | 2 Piece Top |
| Tank | French Cut | Twist |
| Flip | Kit Kat | Halter |
| Bandeau | Boy Leg | . |
| . | . | . |
| . | . | . |
| . | . | (8 selections) |
| (9 selections) | (12 selections) | |

Preferably, the system is menu driven. The system first requests that the operator select a 1 piece or 2 piece suit. This selection is noted in decision step 132. If a 1 piece suit was selected, a selection of 1 piece suits is displayed in a menu on one of the monitors and the operator selects from that menu. The operator selects in step 133 a size for a particular suit. The size selection can be either a menu selection or a numerical input. For example, if the customer wanted a 1 piece tank suit, the customer tells the operator, the operator initially selects the 1 piece suit, the system then displays the menu selections for 1 piece suits, as shown in Table A above, and the operator then selects the standard "tank" suit. The system then displays the various sizes for the "tank" bathing suit, such as sizes 1, 2, 3, 4. The operator, after being prompted to do so, numerically selects size 5. The size selection may be menu driven. In addition to a size, each design sample suit also has a leg line size associated with the suit. For example, the customer may want a tank suit with a low leg (LL size 0) or a very high leg cut (LL size 7). This leg line size is input by the operator. Accordingly, the operator has now selected for the particular customer a standard style and size of a bathing suit from a plurality of style and size suit selections. If the customer wants a 2 piece suit, the 2 piece branch is taken from decision step 132 and in step 134, the operator picks the 2 piece bottom, for example French Cut, the size of the 2 piece bottom, for example 5, the leg line size for the bottom, the style selection for the 2 piece top, for example Twist, and the size for the top, for example 5. The size selections do not necessarily have to match customary or commercially used bathing suit sizes but these sizes may be assigned by the store owner to correspond to a particular style that the owner has developed.

In step 136, the operator is prompted or instructed to place the customer wearing the design sample suit in the viewing booth such that the camera captures the front view of the customer. The camera must be aimed and focused. Preferably, the customer's arms should be perpendicular to her trunk such that a clear frontal view is obtained for the video display. During step 136, video camera 22 is generating a plurality of front video frame image signals that are digitized. Computer 16 places those digitized signals onto video display monitor 30. In step 138, the operator is prompted to select or freeze a particular video frame image with a cursor control command. Upon selection (actuation of the cursor control), the computer stores that video image as a front video image (FTVID). The front video frame image is stored in memory 18 of computer 16. In step 140, the operator is prompted to repeat the procedure and input and store a side video frame image and a back video frame image of the customer. The computer stores these as side view images (SDVID) and back view video images (BKVID). During the side view, the customer is instructed by the operator to raise her arms such that her arms are perpendicular to the trunk of her body and in front of her. In the back view, the customer's arms should be stretched out away from her side.

After the operator has stored front, side and back video frame images, the system, in step 142, displays the front view video frame image. In step 143, the operator is prompted to select and does select a plurality of vertically disposed measuring points along these outline maps. The following table, Table B—Mark Points, shows exemplary points that are selected by the operator.

TABLE B

| | MARK POINTS |
|---|---|
| TB | Top Bust Suit Line |
| FB | Front Edge of Bust(Full Bust Line) |

TABLE B-continued

MARK POINTS

| | |
|---|---|
| LB | Lower Bust Suit Line |
| W | Narrow Waist |
| N | Navel |
| THD | Desired Top Hip Suit Line |
| FBT | Full Buttocks |
| THA | Top Hip Suit Line for Design Sample |
| BHD | Desired Bottom Hip Suit Line |
| BHA | Bottom Hip Suit Line for Design Sample |

The top bust suit line (TB) generally corresponds to the top of the suit. These mark points are graphically shown in quadrant 410 in FIG. 12. The operator may be prompted to identify a subset of the mark points listed in Table B. At a minimum, the operator selects THD, THA, BHD and BHA for a 2 piece suit and at least BHD and BHA for a 1 piece suit. In any event, the operator selects the plurality of vertically spaced points along the video images.

The operator is then prompted, in step 144, to outline the front view video frame image. Currently, this is done by moving mouse cursor control 26 over a table and the video screen cursor moves correspondingly on monitor 30 which also displays FTVID. Essentially, the operator moves the cursor to the top right hand side of displayed the female trunk form where the bathing suit will begin, presses down on the control button on mouse 26 and maintains that pressure as the operator outlines the right side of the female form. The cursor is moved down the right hand side of the female, follows the right front curved line of the female form, crosses the crotch area, follows the left hand front curved line of the form up to the upper left point of the female trunk form. The cursor control is the released at the top left hand side of the form at the top of the female trunk form or top of the suit. The operator is then prompted to instruct the computer that the outlining procedure has been completed. Alternatively, the operator could be given the option to redraw the outline by a "redo" command selectable by mouse 26 on video display monitor 30. In any event, the front outline map (FTOUT) is stored in the computer in step 146.

Figure 5:
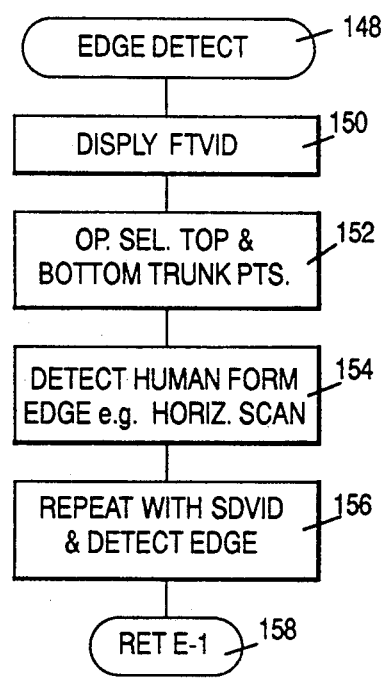
FIG. 5 illustrates, in block diagram form, the edge detection routine.

Rather than have the operator draw the outline of the female form or other human form, the computer could be programmed to detect the human outline form. An edge detection routine 148 is illustrated in block diagram form in FIG. 5. In the edge detection routine, the system firsts display the front view video frame image in step 150. The operator selects the top and bottom trunk points in step 152. By selecting the top and bottom trunk points, the operator commands the computer to search for a transition from light to dark or a change in the color of the video frame image, i.e. edge detection, by way of a computerized horizontal scan between the identified upper and lower points. This is noted in step 154. By targeting the upper and lower limits of the trunk, the computer need only scan horizontally within that vertically defined range. In step 156, the same procedure is repeated with the side view video frame image. The same procedure is also used with the back view. In step 158, the edge detection routine is left and the main program is resumed at jump point E-1.

In the current embodiment of the invention, the operator is prompted to input or electronically mark the desired top hip suit line (THD) and the top hip suit line for the design sample suit (THA) currently worn by the customer and displayed in the video image This input is only necessary for a 2 piece suit. For both 2 piece and 1 piece suits, the operator inputs the desired bottom hip suit line (BHD) and the bottom hip suit line for the design sample suit (BHA) illustrated on the monitor screen. These last two points correspond to the actual lower leg line (BHA) on the design sample suit and the desired lower leg line (BHD) identified by the customer and input by the operator. Thereafter, the operator is prompted to outline the front video image (FTVID). Then the operator is promoted to input certain other vertical marking points, e.g., narrow waist W and navel N.

After the operator has electronically outlined the front view video image frame signal and marked the same, a similar routine is conducted with the side view video frame image signal (SDVID) in step 147. The operator electronically outlines the side view and this outline is electronically stored as a side outline map (SDOUT). However, in the side view, the crotch point of the human is not visible. The program may include a crotch identification routine and, if so, in decision step 160 the yes branch is taken, the program executes step 162. In that step, the operator selects the bottom hip suit line for the design sample suit (BHA) worn by the customer. Alternatively, the operator could select the upper edge of the trunk while viewing the side view image. In step 163, the system calculates a trunk length point from BHA on the front outline map (FTOUT) to the lowest point on the front outline map. The computer, then having an input identifying the actual bottom hip suit line (BHA) on the side view and the trunk length determined by step 163, calculates or estimates the crotch point on the side view video frame image in step 164. The system displays the crotch identification point in step 164, and the operator outlines the front edge side view of the female form, passing through the displayed crotch identification point, and then outlines the back portion of the side view of the female form. The program then returns to the no branch from decision step 160.

In the present embodiment, when the monitor switches from the front video image (FTVID) to the side video image (SDVID), the monitor displays a "ghost" on the screen that enables the operator to visually identify the crotch point on the SDVID.

In step 166, the operator is further instructed to obtain the side outline map (SDOUT) and the back outline map (BKOUT) from the side video frame image (SDVID) and the back video frame image (BKVID). Some of the mark points, Table B above, may be input by the operator while viewing SDVID rather than FTVID. For example, mark point FB or full bust is best viewed from the side. See FIG. 12, quadrant 412.

In step 168, the video display monitor 30 displays the outline maps. In the current embodiment, the monitor is configured as a split screen divided into quarter quadrants. The three quadrants display the front outline map (see generally FIG. 12, region 410), the side outline map (see generally region 412) and the back outline map (see generally region 414). The mark points are carried forward and displayed on the outline maps by a computer matching technique (for example, distance to lowest point, i.e., crotch point).

In step 174, the operator is prompted to target starting and ending points of various traces or curve lengths over the outline maps. For example, in step 174, the operator identifies the beginning of the bust trace (TR1) by placing the cursor at the correct location on the side outline map in quadrant 412 in FIG. 12 and actuating the control button on the cursor. By targeting TR1-PT1, the computer electronically marks the beginning of the bust trace. The operator then moves the cursor to the next target point TR1-PT2. This is the lower bust trace point. This step is shown as step 176 in FIG. 2 of the main program operation. The operator then selects the start and end points for trace two (TR2-PT1 and TR2-PT2) over the front, lower trunk portions (steps 178 and 179), and then targets the end point (TR3-PT2) of trace three (TR3) over the back lower trunk portion in step 180. In step 182, after selection of TR3-PT2, the computer sets TR3-PT1=TR2-PT2 since the ending point of the front lower trunk trace is the beginning of the back lower trunk trace. In step 184, the operator identifies that the tracing routine is complete. As discussed hereinafter, the computer calculates the curve length for these various traces and can compare some of the information to a size chart. This information is eventually made available to the operator and ultimately to the seamstress.

In step 186, the computer calculates the circumference of the female form by calculating the elliptical curve at the various marked points such as top bust suit line (TB), front edge of bust (FB), and the desired top hip suit line (THD).

Figure 6:
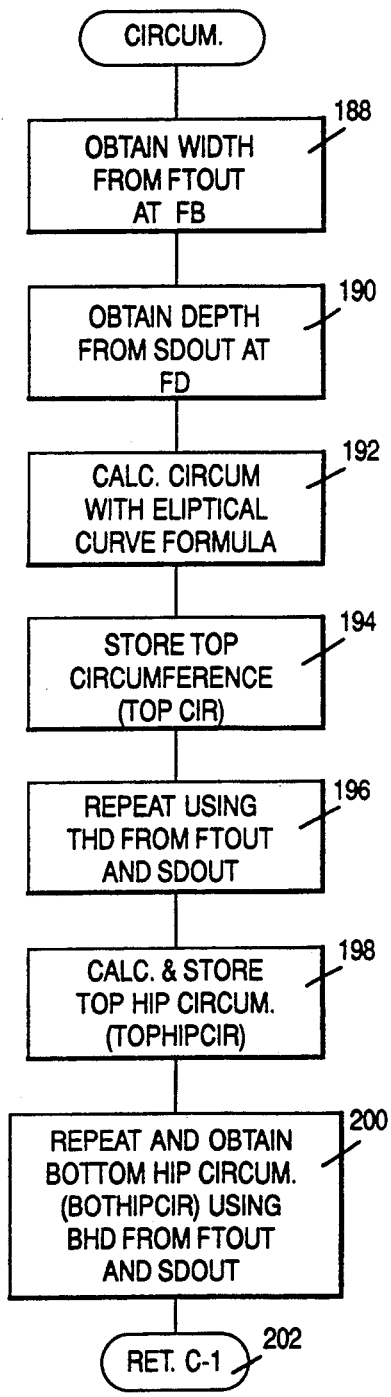
FIG. 6 illustrates, in block diagram form, the circumference calculation routine.

The circumference routine is shown in block diagram form in FIG. 6. As an introduction, it is known that the circumference of the human form can be approximated by elliptical curves taken through horizontal planes at various vertical points along the human form. The circumference routine illustrated in FIG. 6 begins by obtaining the width of the human or female form in step 188 by determining the distance between opposing front outline map points coplanar with a particular marked point. In this step, the marked point selected is the front edge of bust or full bust point FB. The opposing points are points 189 and 191 on the front outline map (FTOUT) shown in quadrant 410 in FIG. 12. The computer electronically measures the distance between points 189 and 191 and then normalizes or scales that measurement. The scaler is obtained from the calibration routine discussed above. The depth of the human form is obtained by measuring opposing outline points from the side outline map (SDOUT) illustrated in quadrant 412 of FIG. 12. These opposing points at horizontal plane defined by marked point FB are points 193 and 195 shown in quadrant 412, the side outline map in FIG. 12. This step is step 190 in FIG. 6. These scaled width and depth scaled dimensions are then utilized in conjunction with an elliptical curve formula in step 192. The elliptical curve formula will provide the length of the circumference of the curve and the curve length at mark point FB is stored in the illustrated embodiment as TOPCIR in step 194.

Other human form circumferences are obtained using various other marked points. For example, in step 196, data for the top hip circumference (TOPHIPCIR) is obtained by utilizing the marked point THD for the desired top hip suit line for the customized suit. The distances between opposing outline map points are calculated at marked point THD and in step 198, the computer calculates the top hip circumference (TOPHIPCIR) for the female. In step 200, the computer repeats these steps to obtain the bottom hip circumference (BOTHIPCIR) using the desired bottom hip suit line mark point BHD from the front outline and side outline maps. In step 202, the circumference routine is exited and the program returns to the main routine (FIG. 2) via jump point C-1.

Of course, the computer can calculate the circumferences of the female form at all of the marked points. However, such an explanation is not necessary for the full understanding of the invention herein. The following table, Table C-1-a, lists the circumferences calculated in the present embodiment of the invention.

TABLE C-1-a

| CALCULATED CIRCUMFERENCES | |
|---|---|
| 1 Piece | 2 Piece |
| Top Bust - TB | same |
| Full Bust - FB | same |
| Lower Bust (upper rib) - LB | same |
| Waist - N | same |
| Full Buttocks - FBT | same |
| Desired Bottom Hip Line - BHD | same |
| | Desired Top Hip Line - THD |

In step 210, the computerized design system calculates the custom pattern dimensions as summarized in the following table, Table C-1-b, Pattern Dimension Formulas.

TABLE C-1-b

PATTERN DIMENSION FORMULAS

2 Piece Suits
Dimensions/Variables
TB, FB, LB, W, FBT, BHD
General Formula
Top = ((TOPCIR - stretch % (TOPCIR)) 0.25) + seam
Specific Formula
Top = TOPCIR (0.85) (0.25) + 0.3"
1 Piece Suits
Dimensions/Variables
TB, FB, LB, W, FBT, BHD
General Formula - Top Portion
Top Front = ((TOPCIR - stretch % (TOPCIR)) TF-cov % + seam
Top Back = ((TOPCIR - stretch % (TOPCIR)) TB-cov % + seam
Specific Formula - Top Portion
Top Front = TOPCIR (0.85) (0.26) + 0.3"
Top Back = TOPCIR (0.85) (0.24) + 0.3"
General formula - Bottom Portion
Bottom Hip Front [BHFD] = same as top portion
use BOTHIPCIR and BHFT-cov %
Bottom Hip Back [BHBD] = same as top portion
use BOTHIPCIR and BHBK-cov %
Specific Formula - Bottom Portion
BHFD = BOTHIPCIR (0.85) (0.24) + 0.3"
BHBD = BOTHIPCIR (0.85) (0.26) + 0.3"

Table C-1-b, Pattern Dimension Formulas provides an example of how the system determines the cloth cutting dimensions for the customized bathing suit or customized, formfitting clothing. Since the bathing suits are seamed down the side, and since the left hand side of the front piece of the suit is a mirror image of the right hand side of the front piece, the pattern dimension formulas are generally one-fourth of the elliptical curve length calculated in step 186. For example, for a 2 piece suit, to determine the cloth cutting dimension length for the top of the suit, the computer first takes TOPCIR, multiplies it by a stretch factor STR% (estimated at 15%), then subtracts that stretch correction from the top circumference figure (effectively a multiplier of 0.85), divides the result by 4 (multiplier 0.25) and then adds 0.3" for a seam allowance. The computer does similar operations for the top hip cloth cutting dimension, the bottom hip cloth cutting dimension and the other listed dimensions for the 2 piece suit.

To calculate the 1 piece cloth cutting dimensions, since a 1 piece bathing suit has a different percentage of coverage from the front as compared to the back, rather than divide the dimensions by 25%, different scalers are used. Typically, the top coverage factors are 26% for the front and 24% for the back. The bottom coverage factors are 26% for the back suit pattern and 24% for the front suit pattern. For example, in order to obtain the cloth cutting dimension for the top front dimension (TFD), the computer takes the circumference at the full bust position, TOPCIR, and multiplies it times a stretch factor (85%) a top front coverage percentage TFCOV% (26%). Of course, the pattern dimension formulas given above could be calculated at every marking point shown in Table B above. The front and back coverage correction factors may be eliminated in certain instances, as is appropriate for the style and size selected by the operator.

Returning to FIG. 2, after the design program determines the cloth cutting dimensions in step 210, the program then obtains the standard pattern maps for the selected style and size of the suit in step 212. The standard pattern maps correspond to the design sample worn by the customer during the video input phase of the program. These standard pattern maps are represented by data points as shown in Table C-2-a which follows:

TABLE C-2-a

| | DATA POINT TABLE | | | | | | |
|---|---|---|---|---|---|---|---|
| Pt.# | 1 | 2 | 3 | ... | 19 | 20 | 21 | 22 |
| X | 0 | 1.7 | 1.7 | ... | 8.4 | 8.5 | 7.0 | 0 |
| Y | 0 | 0 | 0.2 | ... | 4.2 | 4.2 | 11.2 | 11.2 |

Figure 13:
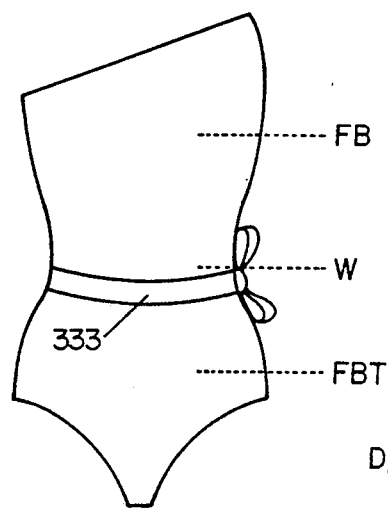
FIG. 13 schematically illustrates a custom pattern map overlaid atop a standard pattern map.

FIG. 13 schematically illustrates an exemplary standard pattern map shown in solid lines in that figure. Various data points are identified on the standard pattern map and each point is assigned an X, Y coordinate as exemplified in the Data Point Table above. Accordingly, the computerized design program has a look-up table of standard pattern maps corresponding to each style size of standard bathing suit. In step 214 (FIG. 2), the computerized design system calculates the custom data points for a customized suit. To give an example of how this is accomplished, let us assume in FIG. 13 that the standard pattern map should be made smaller because the female is smaller than the standard size suit. Accordingly, FIG. 13 illustrates a front right, side panel of the bottom of a 2 piece suit. The left side panel is a mirror image of the right. Standard pattern map data point DPT.21 must be changed to make the custom pattern map smaller than the standard pattern map. The computer would obtain the top hip front cloth cutting dimension (THFD) and would calculate the difference in the X dimension between DPT.22 and DPT.21. As is evident, the top hip front cloth cutting dimension is established by the mark point THD, the desired top hip suit line point, and this corresponds to the upper suit line edge in FIG. 13. Since the THFD cloth cutting dimension should correspond to the custom pattern map, the X, Y coordinate for DPT.21 is changed to the X, Y coordinate for DPT.21', as shown in broken lines in FIG. 13. Similar operational steps change the vertical aspect of the standard pattern map to a custom pattern map using actual top hip line for the design sample (THA) worn by the customer and the desired top suit line (THD). The program then adjusts the y or vertical dimension points of the custom suit. The bottom hip suit line THD is used to change DPT.19 to DPT.19'. These customized data points are appropriately stored. In step 216 (FIG. 2), the computer re-calculates the curves in the standard pattern map such that the custom pattern map has the same curves as the standard pattern map. For example, the curve between data point 19' and data point 2 should be the same as the curve between data point 19 and data point 2.

Figure 12:
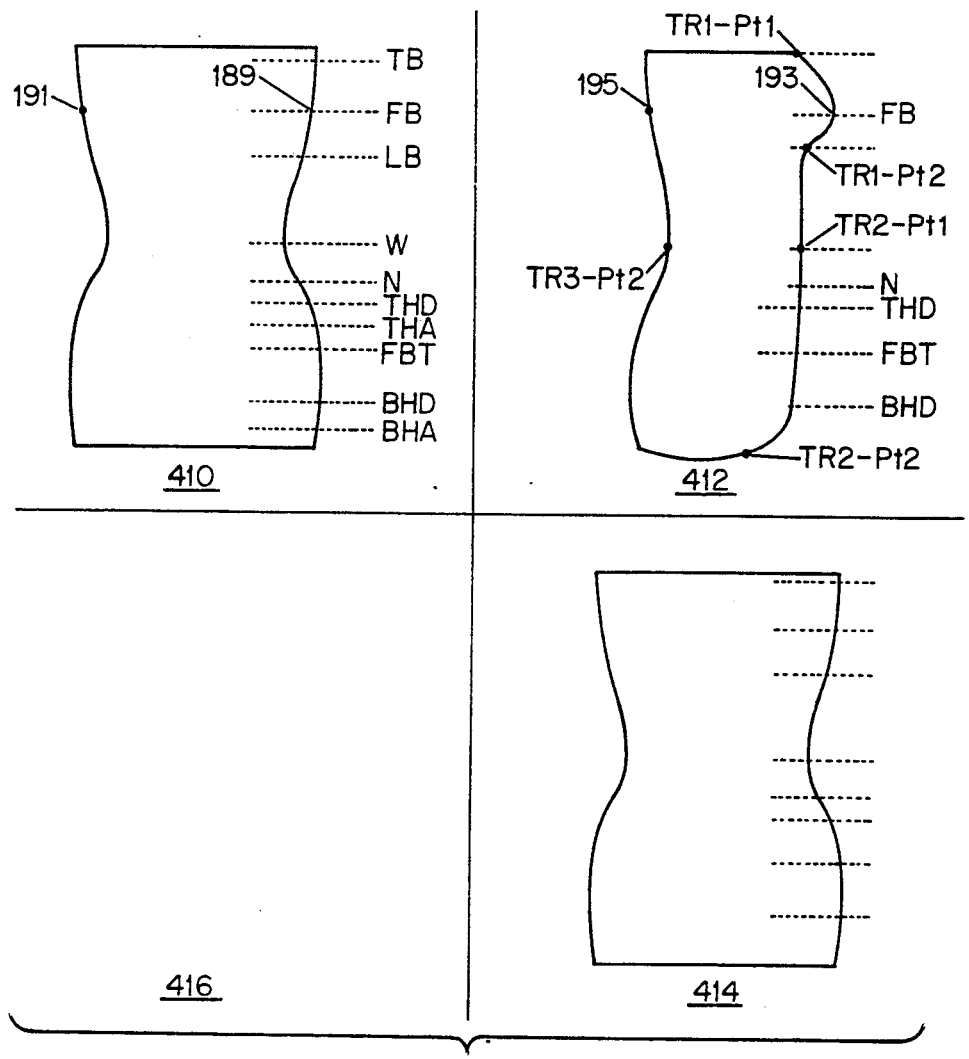
FIG. 12 schematically illustrates the front, side and back outline maps for a female form.

In step 218, the program displays front, side and back outline maps with the cloth cutting dimensions for the top bust suit line, front edge of bust or full bust, lower bust suit line, narrow waist, navel, top hip suit line, full buttock suit line and bottom hip suit line. These cloth cutting dimensions are shown near the corresponding outlines and in the appropriate quadrant as shown in FIG. 12. Numbers would replace TB, FB, LB, W, N, THD, FBT and BHD. In the fourth quadrant 416, shown as a blank in FIG. 12, an options menu table is displayed at this point in the program. An exemplary options menu table follows as Table C-2-b.

TABLE C-2-b

OPTIONS MENU TABLE

* Edit Pattern
  Customer Selected Style and Size (e.g., Brazilian Size 2)
* Redo
  Draw Mode
    * Front
    * Back
    * Side
* Design Options
* Enter Data The items designated with an asterisk Table C-2-b indicate that the operator can select these routines in order to change or add features to the customized bathing suit.

In steps 219 and 219', the computer system calculates the length of the curve for traces TR1, TR2 and TR3 using standard curve formulas. For example, the bra trace TR1 from TR1-PT1 to TR1-PT2 in quadrant 412 of FIG. 12 gives an indication of the size of the bra for the female. In step 219', this bra trace TR1 could be compared with the bra size data table and a suggested bra size is obtained from the table. Of course, the computer could execute steps 219 and 219' prior to the display step 218 and may even calculate these trace lengths immediately after step 184, the end trace step.

In decision 220, the operator selects various options. If the yes branch is taken step 222 causes the main program to enter into one of the option routines. These option routines are the edit pattern routine shown in FIG. 7, a "redo" routine which is essentially an error correction routine which allows the operator to go back and change one or more of the inputs previously entered into the system, a draw mode routine (FIG. 8), a design options routine (FIG. 9) and a data entry routine. Other than the "redo", all the other routines are discussed in detail herein. The "redo" routine is simply an error correction loop. The data entry routine permits the operator to exit this portion of the program after he or she enters various customer data. This feature will be described later.

Figure 7:
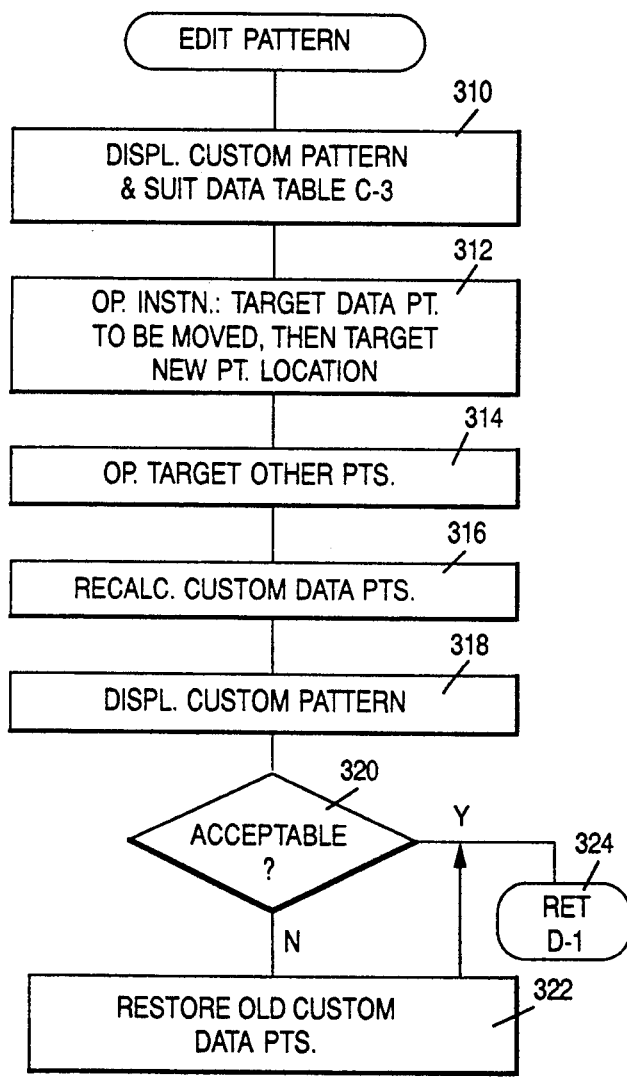
FIG. 7 illustrates, in block diagram form, the edit pattern routine.

The edit pattern routine is shown in block diagram form in FIG. 7. In step 310, the computer system displays one or more of the custom pattern maps and the Suit Data Table, Table C-3, that follows. A single custom pattern map such as that shown in FIG. 13 could be displayed on video display monitor 30 or several custom pattern maps could be displayed in a split screen format. In any event, the Suit Data Table, Table C-3, is displayed in one of the quadrants. An exemplary Suit Data Table follows:

TABLE C-3

SUIT DATA TABLE

Customer Name
Suit  Style_____  Size_____
      Top of 2-Piece_____  Size_____
Operator ID
Trace 1: TR1          Suggested Bra Size_____
Trace 2: TR2
Trace 3: TR3
Circum.     2 PC           1 PC FT      1 PC BK
TOPCIR      TOP            TFDIM        TBDIM
TOPHIPCIR   TOP-HIP        THFDIM       THBDIM
BOTHIPCIR   BOTTOM-HIP     BHFD         BHBD In that table, designators TR1, TR2, TR3, TOPCIR, TOPHIPCIR, etc. are numerical figures calculated for that particular customer. The suit style and size are displayed since these items have already already been selected by the customer and input by the operator in step 130. The suggested bra size may be obtained from step 219' or, alternatively, such information may be solicited by the customer and the operator may input that information into the system.

The essence of this edit pattern program is to enable the operator to further change the custom pattern map. Therefore, in step 312 (FIG. 7), the operator is instructed to target the data point to be moved and to then target the new point location. For example, if it is assumed that FIG. 13 shows in solid lines the custom pattern map and that the operator wants to change data point 21 to data point 21', that is, to give the customer a "tighter suit look", the operator first targets data point 21, depress the control button on mouse 26, moves that multi-directional cursor control to data point 21', and again depresses the control button on the cursor control. In step 314, the operator changes other data points, such as data point 19 to data point 19'. In step 316, the program re-calculates the custom data points and alters the custom pattern map to provide an altered custom pattern map. This altered custom pattern map is displayed in step 318. In decision block 320, the operator determines whether the altered custom pattern maps are acceptable. If they are not, step 322 restores the old custom data points and hence the old custom pattern map. If the changed pattern map is acceptable, the program returns, in step 324, to jump point D-1 in the main program (FIG. 2), a point immediately preceding step 218. Accordingly, the edit pattern routine is an operator controlled means for further altering the custom patter maps.

Figure 8:
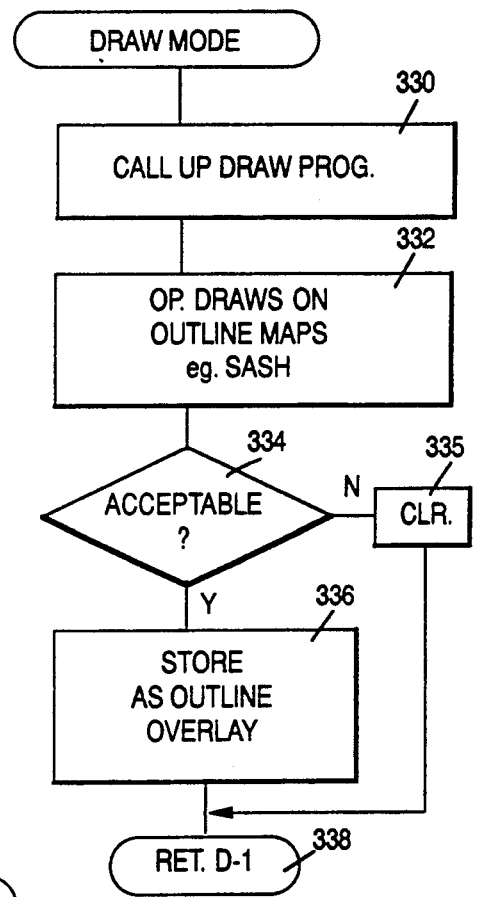
FIG. 8 illustrates, in block diagram form, the draw mode routine.
Figure 14:
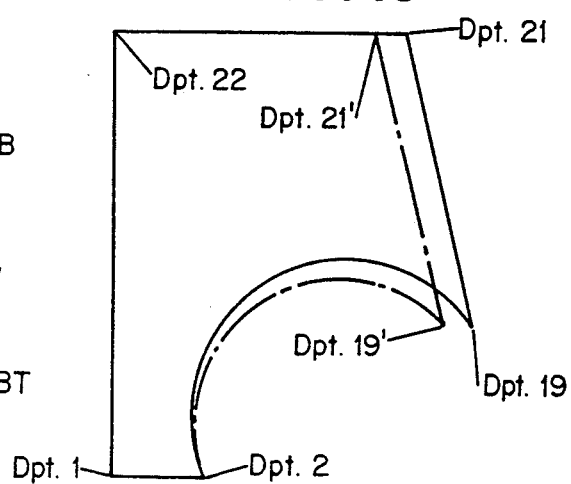
FIG. 14 schematically illustrates a front outline map with a design feature electronically drawn thereon.

FIG. 8 illustrates, in block diagram form, the draw mode routine. As shown in Options Menu Table C-2, the operator can select the draw mode routine for the front, back or side outline maps. The first step in the draw mode routine is step 330 wherein the computer system calls up an electronic drawing routine. Currently, an electronic paint program by Cybernetics is used. In step 332, the operator electronically draws on one of the outline maps. For example, FIG. 14 illustrates a front outline map with a sash 333 electronically drawn on that map. In step 334 (FIG. 8), the operator determines whether such additional feature is acceptable and if it is not, step 335 clears that feature from the electronic memory of the system. If it is acceptable, the yes branch is taken and in step 336 that additional feature is stored as an outline overlay onto the particular outline where it was drawn. The draw mode returns in step 338 to jump point D1 in the main program (FIG. 2) immediately preceding display step 218. There are many types of electronic drawing routines that could be utilized in the draw mode routine illustrated in FIG. 8. Accordingly, the draw mode routine is an operator controlled means for electronically drawing additional designs on the front, side and back outline maps.

Figure 9:
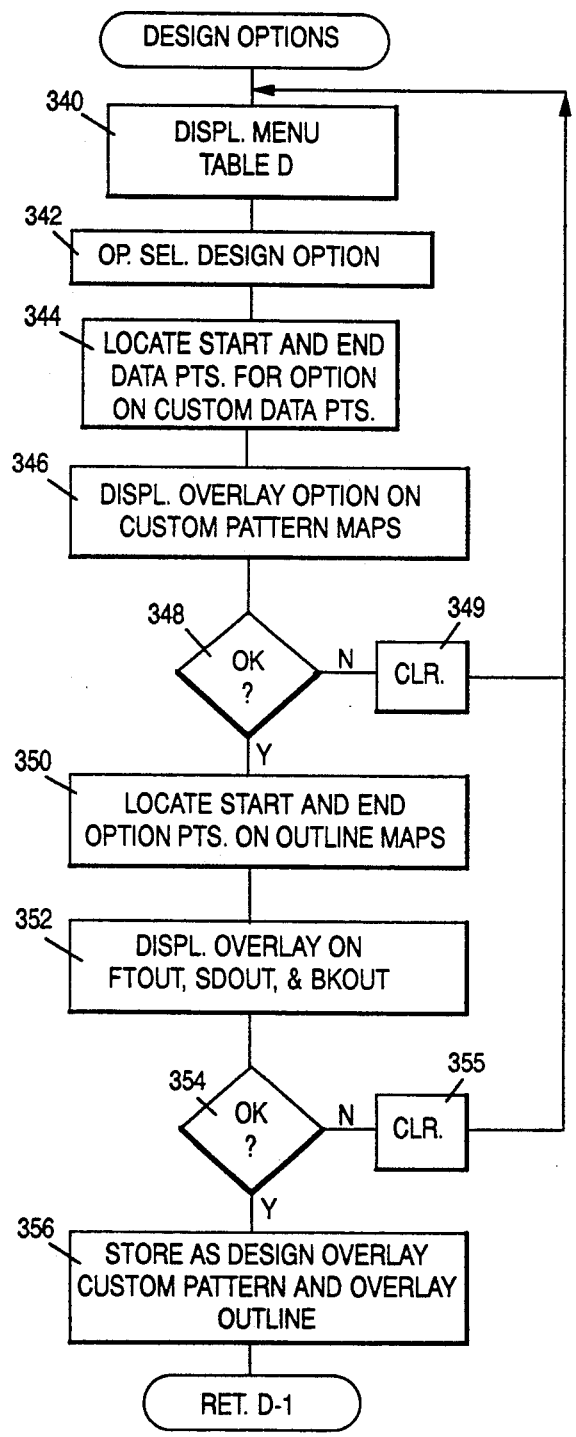
FIG. 9 illustrates, in block diagram form, the design options routine.

Another selection available to the operator in step 220 is the design options routine illustrated in block diagram form in FIG. 9. Design options routine begins with step 340 that displays a menu table, Table D, Design Option Menu Selections.

TABLE D

DESIGN OPTION MENU SELECTIONS

| | |
|---|---|
| Fringe | |
| Location | Top, Bottom, Front, Back |
| Longest Length | 1.0, 1.25, 1.5 . . . 3.0 |
| Shortest Length | 0.25, 0.5, 0.75 . . . 1.0 |
| Width | 0.25, 0.5, 0.75 |
| Ruffle | |
| Location | go to ruffle location prog |
| width | 3.0, 3.5, 4.0 . . . 8.0 |
| length | 0.5, 1.0, 1.5 . . . 3.5 |
| ruffle type | |
| full | |
| slight curl | |
| V-shaped curl | |
| Sash | |
| Location | go to sash location prog |
| width | 1.0, 1.5 . . . 3.5 |
| Bow | Yes/No |
| side | Left/Right |

In step 342, the operator selects one of the design options. For example, assume that the operator selects the fringe option. The operator then selects the location of the fringe, that is, on the top, bottom, front or back of the various suit portions. The operator then selects the longest length of the fringe from a predetermined number of fringe lengths, the shortest length of the fringe from a plurality of short fringe length numbers, and the width of the fringe. In step 344, the operator identifies the beginning and end points of the design option to be added to the custom pattern maps. In step 346, the system overlays this selected design option on the custom pattern maps. In decision step 348, the operator decides whether this design option is acceptable and if it is not, step 349 clears that option. If the design option is acceptable, in step 350, the operator selects the start and end points for the design option on the front, side and back outline maps. In step 352, the design program overlays the design option on the front, side and back outline maps. The operator, in decision step 354, determines whether this option is acceptable and, if not, step 355 clears the option. If the option is acceptable, in step 356 the design option is overlaid on top of the custom pattern maps and the front, side and back outline maps.

It should be noted that the targeting of the beginning and end of the design option feature onto the custom pattern map may not be acceptable and/or necessary. At a minimum, however, it would be helpful to identify the beginning and ending points of the design option on the front, side and back outline maps.

The design option routine can be further expanded by having the operator select more menu selections. For example, in the fringe location portion, the operator may additionally select whether the fringe is to hang from the top edge of the front, top of a 2 piece suit or whether the fringe is to hang from the bottom edge of the front of the top of a 2 piece suit. Also, a subroutine could be incorporated into the design options routine such as a ruffle location program, shown in block diagram form in FIG. 10.

Figure 10:
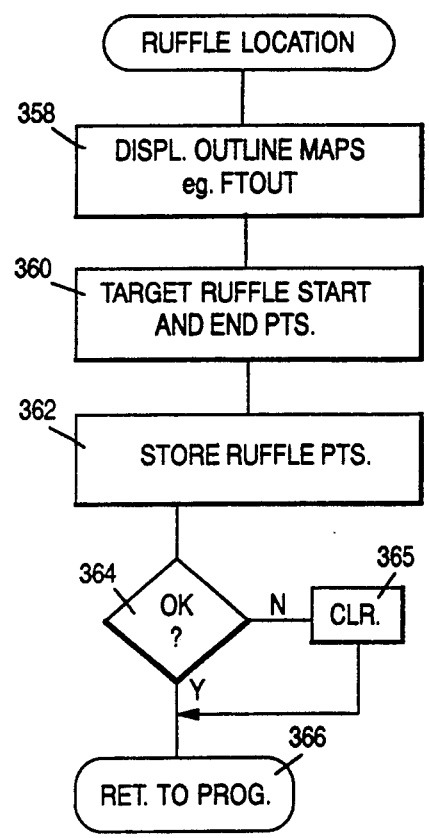
FIG. 10 illustrates, in block diagram form, the ruffle location routine.

The ruffle location program shown in FIG. 10 begins with step 358 which displays the outline maps such as the front, side and back outline maps. In step 360, the operator targets the ruffle start and the ruffle end points on a particular outline map. In step 362, these ruffle points are stored and in step 364 the operator determines whether a ruffle is acceptable or not. If it is not, in step 365 the ruffle data is cleared. If the ruffle data is correct, the subroutine in step 366 returns to the design option routine at an appropriate location. The sash location program identified in Table D above is similar to the ruffle location program. Additionally, however, the operator may be prompted to identify the leftmost upper sash point, the leftmost lower sash point, the rightmost upper sash point, and the rightmost lower sash point in the sash location program.

Returning to FIG. 2, if the operator does not select any options in decision step 220, the no branch is taken and decision step 224 is encountered wherein a determination is made whether the operator has selected the "enter data option" from Table C-2 above, The Options Menu Table. The computer design system requires that the operator input certain customer data. Table E that follows is an example of a Customer Data Table.

TABLE E

| CUSTOMER DATA TABLE | | |
|---|---|---|
| Name | | |
| Address | | |
| Selected Style | Brazilian | Top: Bandeau |
| Size | 2 | 5 |
| Operator ID | | |
| Comments: | Thong Back, Fringe on Bottom Front Only | |
| Comments: | | |
| Press Control A to Escape | | |

The operator inputs data into the system by typing on keyboard 24 the customer's name, address, the operator ID and various designer comments that the operator may think important to the seamstress making the swimsuit. The selected style and size has been input by the operator during step 130 of the main program and is displayed in this step.

In step 226, the computerized design system presents a split screen display, as shown in FIG. 12, with the front, side and back outline maps with any overlays that were previously input by the operator. For example, FIG. 14 may be placed in quadrant 410 of FIG. 12 if the operator had electronically drawn in a sash using the draw mode routine. Optionally, the maps may be displayed without the overlays and then, upon appropriate command, the overlays could be displayed. The cloth cutting dimensions would be listed as TB, FB, LB . . . adjacent each of the marking lines in the front, side and back outline maps. In quadrant 416, Suit Data Table C-3 would be reproduced.

Of course, the design program could be simplified by showing simply the full bust cutting dimension FB, the narrow waist cutting dimension W, and the full buttock cutting dimension FBT (shown in FIG. 14). However, it is equally feasible to illustrate all the custom pattern dimensions as shown in Table C-4 that follows.

TABLE C-4

| EXPANDED CUSTOM PATTERN DIMENSION TABLE | | |
|---|---|---|
| Mark Pt. | Pat. Dim. Id. | Description |
| TB | TBXD | Top Bust Pat. dim. |
| FB | FBXD | Full Bust Pat. dim. |
| LB | LBXD | Lower Bust Pat. dim. |
| W | WXD | Waist Pat. dim. |
| THD | THXD | Top Hip Pat. dim. |
| FBT | FBTXD | Full Buttock Pat. dim. |
| BHD | BHXD | Bottom Hip Pat. dim |

In decision 228, the operator determines whether any of the modifications, design options, extra features, etc., are acceptable and if not, the program returns to a point immediately preceding display step 218. If the outline maps are acceptable, the yes branch is taken and in step 230, the system displays the custom pattern maps. For example, FIG. 13 illustrates a typical custom pattern map. Preferably, the standard pattern map would appear in dashed or broken lines and the custom pattern map would appear in solid lines. In step 232, the operator determines whether the pattern maps are acceptable. If they are not, the program returns to a point immediately preceding display step 218. If the pattern maps are acceptable, the yes branch is taken and the program executes step 234 which prints out the outline maps with any overlays generated by additional design features or characteristics, plus Suit Data Table C-3 and the custom pattern maps. In the present embodiment, the system produces a print out similar to FIG. 12 except that in quadrant 416, the Suit Data Table information is inserted therein. Additionally, the system would print out the Customer Data Table, Table E. If additional features were added to the customized suit, such as ruffles, fringe or a sash, the custom pattern maps without the overlays could be printed and then the maps with the overlays could be printed. In this manner, the seamstress has a hard copy of just the maps with no overlays and he or she could cut the cloth by simply laying the map over the cloth. The second map with overlays could be used later to add the fringe, ruffle or whatever.

If a distributed manufacturing system were to be instituted as shown in FIG. 1, an electronic representation of the outline maps, Suit Data Table, Customer Data Table, and custom pattern maps would be electronically sent over telecommunications link 14 to the main computer 42 that is remotely disposed with respect to local computer system 10. It is important that the operator initially designing the custom, formfitting clothing see or have a human perceivable output of the front, side and back outline maps, the Customer Data Table, the Suit Data Table, and the custom pattern maps. Preferably, a print out of some or all of this information is shown to the customer seeking the bathing suit or other formfitting clothing at local computer 10. The additional information, such as the trace lengths (TR2, TR3) is useful in manufacturing the custom made suit. At the remotely disposed main computer system 12, a human perceivable version of this information reproduced. A monitor could display the custom pattern maps at that location and this is a human perceivable version of those maps. Further, the remotely disposed main computer system 12 could be directly coupled to a cloth cutting machine that would automatically cut the cloth from the custom pattern maps (without overlays) for the formfitting clothing or bathing suit. The cloth cut in this manner is also a human perceivable representation of the custom pattern maps.

Figure 11:
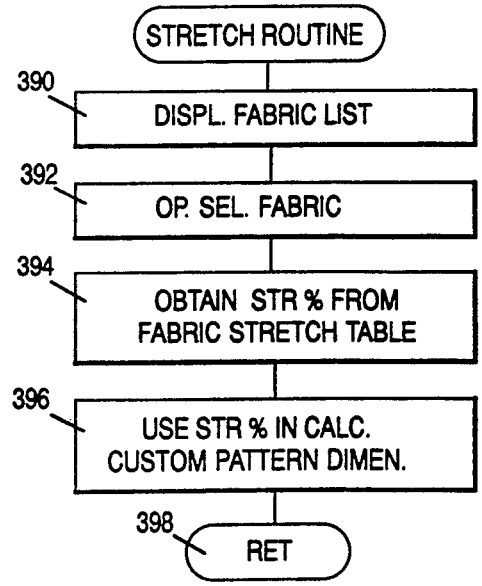
FIG. 11 illustrates, in block diagram form, the stretch routine.

It is well known that fabric stretches. It is further well known that fabric stretches differently in a horizontal aspect than in a vertical aspect. As used herein, the terms horizontal and vertical are co-linear with the horizontal and vertical thread lines in the fabric. When designing formfitting clothing, stretch factors must be taken into account. For example, it is preferred that the high stretch dimension of the fabric be placed horizontal about the female or human form. In other words, the fabric should only stretch a minimal amount vertically and a maximum amount horizontally. Although this computerized design system accounts for fixed stretch factors in the Pattern Dimension Formulas table C-1-b above, the system may further include a stretch routine shown in block diagram form in FIG. 11. The stretch routine first identifies and displays a fabric list in step 390. In step 392, the operator selects a particular fabric. In step 394, the system obtains a stretch percentage factor from the Fabric Stretch Table. An example of a Fabric Stretch Table, in an abbreviated form, is found in Table F, which follows.

TABLE F

| Fabric | FABRIC STRETCH TABLE | | | |
|---|---|---|---|---|
| | Horiz. | Vert. | Factor(H-V) | Str %(H-V) |
| Metallic | 2"–2" | 2"–2" | 1-1 | 0-0 |
| Aqua-Wet Look | 2"–3.8" | 2"–2.4" | 6-5 | 30%-10% |
| Tricot | 2"–4" | 2"–3.5" | 10-10 | 35%-25% |

Stretch data for Table F could be gathered by taking a 2" by 2" square of various types of fabric, and stretching them to their maximum extent both horizontally and vertically to obtain these numbers. For example, with respect to the tricot fabric illustrated in Table F above, a 2" square swatch of fabric was stretched from 2" (at rest dimension) to 4" (maximum stretch length) in a horizontal aspect and from 2" to 3.5" in a vertical aspect. Since tricot is a high stretch fabric, a stretch factor of 10-10 was assigned. Factor "10" corresponds to an extremely high stretch fabric. The stretch percentage assigned to tricot was 35% in a horizontal aspect and 25% in a vertical aspect. These figures for the horizontal stretch factor would be utilized in the pattern dimension formulas illustrated above in Table C-1. Step 396 illustrates the use of a stretch factor (Str%). The system described herein could be changed to account for vertical stretch by calculating vertical dimensions of the female from the outline maps and correcting the standard pattern maps in the Y or vertical direction. Step 398 returns to the main program. The operator could be prompted to select a fabric near the end of the program or for multiple orders.

The claims appended hereto are meant to cover modifications and changes within the spirit and scope of the present invention.

What is claimed is:

1. A system for designing custom made, formfitted clothing for a human body form comprising:
   a video camera system for capturing at least front and side views of said human form and generating corresponding front and side video frame image digitized signals;
   means for outlining on a display the front and side trunk of said human form based upon video images produced from said front and side video frame image signals to produce on a display front and side outline maps of said trunk;
   operator selectable means for selecting a plurality of vertically disposed measuring points along said front and side outline maps, said measuring points being selected based upon the size and style of said formfitted clothing;
   means for calculating the lengths of a plurality of circumferential curves about said human form at said measuring points based upon said front and side outline maps and said leg line dimension;
   means for converting the curve lengths into cutting dimensions for cloth;
   means for selecting a style and size from a stored look-up table of standard style and size selections of formfitted clothing, said look-up table containing standard pattern maps of said standard style and size clothing and said measuring points for each style and for displaying said measuring points for said selected style;
   means for generating custom pattern maps by altering the standard pattern maps for said selected style and size based upon said cloth cutting dimensions;
   means for displaying the custom pattern maps and the cloth cutting dimensions; and
   means for producing a representative output of said custom pattern maps and said cloth cutting dimensions.

2. A system as claimed in claim 1 wherein the representative output of said custom pattern maps and said cloth cutting dimensions is a printed output.

3. A system as claimed in claim 1 wherein said representative output includes custom pattern map and cloth cutting dimension signals which are formatted for transmission to a remote location.

4. A system as claimed in claim 3 wherein said video camera system, means for outlining, means for selecting, means for calculating, means for converting, means for selecting a style and size, look-up table, means for generating, means for displaying, and means for producing are part of a local computer system, the system for designing custom made clothing further including a remote computer system which includes means for controllably receiving said custom pattern map and cloth cutting dimension signals and means for producing a human perceivable representative output of said custom pattern maps and cloth cutting dimensions.

5. A system as claimed in claim 1 wherein said video camera system captured a back view of said human form and generates a back video frame image as digitized signals, said means for outlining generates a back outline map based upon said back video image, said means for displaying also displays said front, side and back outline maps.

6. A system as claimed in claim 5 wherein said means for displaying first displays said front, side and back outline maps, in a split screen format, and then displays said custom pattern maps.

7. A system as claimed in claim 6 wherein said means for displaying displays said front, side and back outline maps simultaneously with said cloth cutting dimensions.

8. A system as claimed in claim 6 wherein said means for producing is operator controlled and produces a printed output representative of said custom pattern maps, said front, side and back outline maps and said cloth cutting dimensions.

9. A system as claimed in claim 5 wherein said means for displaying is coupled to said video camera system and displays front, side and back views of said human form utilizing the corresponding front, side and back video frame signals; said means for outlining being an operator controlled means for outlining and including a multi-directional curser control for said operator such that said operator can view the front, side and back video frame images on said means for displaying and move said multi-directional curser control to outline said human form and generate said front, side and back outline maps.

10. A system as claimed in claim 1 wherein said means for displaying is coupled to said video camera system and displays front and side views of said human form utilizing the corresponding front and side video frame image signals; said means for outlining includes an operator controllable means for identifying upper and lower trunk points, said means for outlining also including an edge detector for generating said front and side outline maps of said trunk limited to the region within said upper and lower trunk points.

11. A system as claimed in claim 1 wherein said video camera system includes an operator selectable freeze frame control, said video camera system generating said front and side video frame images upon receipt of said freeze frame control.

12. A system as claimed in claim 9 wherein said video camera system includes an operator selectable freeze frame control, said video camera system generating said front, side and back video frame images upon receipt of said freeze frame control.

13. A system as claimed in claim 9 wherein said means for outlining includes means for identifying the lower, side map trunk point, said means for identifying trunk point including means for measuring the distance between an upper and lower, front map trunk points on said front outline map and an operator selectable means for identifying an upper, side map trunk point on the side outline map.

14. A system as claimed in claim 12 wherein said system includes an operator controlled, means for identifying a plurality of trace points on said side outline map, said system further including means for calculating outline trace lengths between successive trace points and converting the trace lengths to human form trace lengths, said means for displaying also displaying the human form trace lengths.

15. A system as claimed in claim 14 wherein said human body form is a female and wherein a pair of said trace points is upper and lower bust points on the side outline map of said female trunk, said system including means for determining the bra size of said female based upon said upper and lower bust trace points and the corresponding bra trace length.

16. A system as claimed in claim 1 wherein said means for calculating said curves utilizes an elliptical curve formula and includes means for determining the width and depth of said human form based upon the distance between opposing, front outline points at one of said measuring points and the distance between opposing, side outline points at said one measuring point, said front and side outline points obtained respectively from said front and side outline maps.

17. A system as claimed in claim 12 wherein said means for calculating said curves utilizes an elliptical curve formula and includes means for determining the width and depth of said human form based upon the distance between opposing, front outline points at one of said measuring points and the distance between opposing, side outline points at said one measuring point, said front and side outline points obtained respectively from said front and side outline maps.

18. A system as claimed in claim 1 including an operator selectable means for entering a leg line dimension for a selected style and referencing said dimension to one of said measuring points and moving said measuring point to change the height of a leg opening in said clothing.

19. A system as claimed in claim 17 including an operator selectable means for selecting one of a plurality standard style and size selections of formfitting clothing from said look-up table.

20. A system as claimed in claim 1 including an operator controlled means for further altering said custom pattern maps and generating altered custom pattern maps and generating altered cloth cutting dimensions based upon said altered custom pattern maps, said means for displaying and means for producing utilizing said altered custom pattern maps and said altered cloth cutting dimensions.

21. A system as claimed in claim 19 including an operator controlled means for further altering said custom pattern maps and generating altered custom pattern maps and generating altered cloth cutting dimensions based upon said altered custom pattern maps, said means for displaying and means for producing utilizing said altered custom pattern maps and said altered cloth cutting dimensions.

22. A system as claimed in claim 18 wherein said means for displaying concurrently displays a selected standard pattern map, based upon said selected style and size clothing from said look-up table, and said custom pattern map as an overlay.

23. A system as claimed in claim 21 wherein said means for displaying concurrently displays a selected standard pattern map, based upon said selected style and size clothing from said look-up table, and said custom pattern map as an overlay.

24. A system as claimed in claim 23 including operator controllable means for electronically drawing additional design features on at least one of said front, side and back outline maps and means for storing said additional design features as overlays on said at least one outline map, said means for displaying utilizing said design feature overlays in conjunction with said front, side and back outline maps.

25. A system as claimed in claim 23 including a design option means for adding further clothing design features to at least one of said front, back and side outline maps and an operator selectable means for selecting further design features, said means for displaying overlaying said further clothing design features onto said at least one outline map as selected by said means for selecting further design features.

26. A system as claimed in claim I including means for selecting one of a plurality of stored fabric selections for said selected size and style, said system further including a stored fabric stretch table having a stretch factor corresponding to each fabric in said plurality of fabrics, said means for converting the curve lengths into cutting dimensions of cloth including means for accounting for fabric stretch based upon said stretch factor and reducing said cutting dimension accordingly.

27. A system as claimed in claim 23 including means for selecting one of a plurality of fabric selections, said system further including a fabric stretch table having a stretch factor corresponding to each fabric in said plurality of fabrics, said means for converting the curve lengths into cutting dimensions of cloth including means for accounting for fabric stretch based upon said stretch factor and reducing said cutting dimension accordingly.

28. A system as claimed in claim 1 wherein said human body is a female and said formfitted clothing is a bathing suit, said operator selectable means for selecting a plurality of vertically disposed measuring points requiring selection of at least upper trunk point, lower trunk point, lower bust point, lower hip suit line point and full buttock point.

29. A method of generating custom-made, formfitted clothing designs for a human form with the aid of a computer comprising the steps of:

capturing at least front and side views of said human form as front and side video frame images;

electronically outlining front and side trunk portions of said human form, based upon video images produced from the respective video images to produce on a display front and side outline maps of said human form;

identifying vertically disposed measuring points along said front and side outline maps said measuring points being selected from a look-up table based upon the size and style of said formfitted clothing;

electronically calculating the lengths of curves about said human form at said measuring points based upon said front and side outline maps;

converting the curve lengths into cutting dimensions for cloth;

providing one of a plurality of electronically stored, standard pattern maps and an associated electronically stored set of said measuring points corresponding to one of a plurality of stored standard style and size selections of formfitted clothing;

electronically altering the standard pattern maps based upon said cloth cutting dimensions and said leg line dimension and producing custom pattern maps; and, producing a human perceivable representation of the custom pattern maps and the cloth cutting dimensions.

30. A method as claimed in claim 29 wherein the step of capturing includes obtaining a back video frame image of said human form, said outlining step outlines said back video image to obtain a back outline map, and the step of producing a human perceivable representation includes the step of displaying said front, side and back outline maps.

31. A method as claimed in claim 30 further including the step of displaying said front, side and back video frame images, and wherein the step of electronically outlining includes the step moving a multi-directional curser over said front side and back video images thereby electronically outlining said front, side and back video images.

32. A method as claimed in claim 30 wherein the step of producing a human perceivable representation includes the step of displaying said custom pattern maps.

33. A method as claimed in claim 32 including the step of selecting one of said plurality of standard style and size selections of formfitted clothing, said step of producing a human perceivable representation including the step of displaying, as an overlay, the selected standard pattern map on said custom pattern map.

34. A method as claimed in claim 33 including the step of altering said custom pattern map and generating an altered custom pattern map after the step of displaying said custom pattern map.

* * * * *